US012404001B2

(12) United States Patent
Dourel et al.

(10) Patent No.: US 12,404,001 B2
(45) Date of Patent: *Sep. 2, 2025

(54) METHOD FOR MANAGING THE CONFIGURATION OF AN AIRCRAFT ALTERNATELY COMPRISING TAIL CONES INCORPORATING OR NOT AT LEAST ONE AUXILIARY POWER UNIT OR NOT, AIRCRAFT AND DEVICE MAKING IT POSSIBLE TO IMPLEMENT SAID METHOD

(71) Applicant: Airbus Operations SAS, Toulouse (FR)

(72) Inventors: Pierre Dourel, Toulouse (FR); Benoit Cazor, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,363

(22) Filed: Dec. 11, 2023

(65) Prior Publication Data

US 2024/0199190 A1 Jun. 20, 2024

(30) Foreign Application Priority Data

Dec. 19, 2022 (FR) ...................................... 2213821

(51) Int. Cl.
*B64C 1/06* (2006.01)
*B64C 1/26* (2006.01)
(Continued)

(52) U.S. Cl.
CPC .............. *B64C 1/0685* (2020.01); *B64C 1/26* (2013.01); *B64F 5/40* (2017.01); *B64D 2041/002* (2013.01)

(58) Field of Classification Search
CPC B64C 1/0685; B64C 1/26; B64F 5/40; B64D 2041/002
See application file for complete search history.

(56) References Cited

U.S. PATENT DOCUMENTS 11,358,700 B1 * 6/2022 Poe .......................... B64C 1/069
2002/0084381 A1 * 7/2002 Lemire .................. B64D 41/00
244/54

(Continued)

FOREIGN PATENT DOCUMENTS

CN 106347644 A 1/2017
EP 1010618 A2 6/2000

OTHER PUBLICATIONS

French Search Report for corresponding French Patent Application No. 2213821 dated Jun. 14, 2023; priority document.

*Primary Examiner* — Rodney A Bonnette
(74) *Attorney, Agent, or Firm* — Greer, Burns & Crain, Ltd.

(57) ABSTRACT

A method for managing at least one aircraft configured to alternately occupy a first configuration suitable for a first flight category not requiring any auxiliary power unit and a second configuration suitable for a second flight category requiring at least one auxiliary power unit. The managing method includes a step of removably mounting, alternately, a lightened first tail cone not including any auxiliary power unit or a second tail cone including at least one auxiliary power unit depending on the first or second category of flights to be performed by the aircraft. A method for managing at least one fleet of aircraft, an aircraft, and a managing device configured to implement the method are each also provided.

10 Claims, 4 Drawing Sheets

(51) Int. Cl.
*B64D 41/00* (2006.01)
*B64F 5/40* (2017.01)

(56) References Cited

U.S. PATENT DOCUMENTS

| | | |
|---|---|---|
| 2010/0044502 A1* | 2/2010 | Cazals ............... B64D 41/00 244/54 |
| 2010/0316928 A1 | 12/2010 | Westenberger et al. |
| 2012/0132749 A1* | 5/2012 | Meseguer Mata ..... B64D 41/00 244/119 |
| 2016/0176533 A1 | 6/2016 | Cazals et al. |
| 2017/0066518 A1* | 3/2017 | Gallant ............... B64D 29/06 |
| 2024/0199236 A1* | 6/2024 | Dourel ............... G07C 5/008 |

* cited by examiner

METHOD FOR MANAGING THE CONFIGURATION OF AN AIRCRAFT ALTERNATELY COMPRISING TAIL CONES INCORPORATING OR NOT AT LEAST ONE AUXILIARY POWER UNIT OR NOT, AIRCRAFT AND DEVICE MAKING IT POSSIBLE TO IMPLEMENT SAID METHOD

CROSS-REFERENCES TO RELATED APPLICATIONS

This application claims the benefit of the French patent application No. 2213821 filed on Dec. 19, 2022, the entire disclosures of which are incorporated herein by way of reference.

FIELD OF THE INVENTION

The present application relates to a method for managing the configuration of an aircraft alternately comprising tail cones incorporating, or not, at least one auxiliary power unit or not, and to an aircraft and device making it possible to implement the method.

BACKGROUND OF THE INVENTION

According to one embodiment, illustrated in FIG. 1, an aircraft 10 comprises a fuselage 12 that extends between a front tip 14 and a tail cone 16, wings 18 that lie on either side of the fuselage 12 and main propulsion units 20 connected to the wings 18. The aircraft 10 also comprises at least one electrical system 22.1 and at least one air-conditioning system 22.2. In flight, the main propulsion units 20 generate the power required by the electrical and air-conditioning systems 22.1, 22.2 to work.

In the remainder of the description, a longitudinal direction is a direction parallel to a straight line passing approximately through the front tip 14 and the tail cone 16, parallel to the ground when the aircraft is on the ground. A transverse plane is perpendicular to the longitudinal direction.

The aircraft 10 comprises an auxiliary power unit 24 (also known by the acronym APU) configured to start the main propulsion units 20 and to generate the power required by the electrical and air-conditioning systems 22.1, 22.2 when the main propulsion units 20 are stopped on the ground. In the presence of an auxiliary power unit 24, the aircraft 10 can be operated under certain ETOPS conditions (ETOPS standing for Extended-range Twin-engine Operation Performance Standards).

In one configuration, shown in FIGS. 2 and 3, the auxiliary power unit 24 is positioned in the tail cone 16. The latter comprises a primary structure 26 comprising a plurality of transverse reinforcements, taking the form of frames, that lie parallel to one another and that are positioned in transverse planes, and longitudinal reinforcements connecting the transverse reinforcements to one another. This primary structure is dimensioned to bear the auxiliary power unit 24. The tail cone 16 also comprises a secondary structure 28, taking the form of a fairing, attached to the primary structure 26 and equipment ensuring correct operation of the auxiliary power unit 24. By way of example, this equipment comprises at least one air inlet 30, at least one duct for conveying air from the air inlet 30 to the auxiliary power unit 24, an exhaust port 32 for discharging gases generated by the auxiliary power unit 24 and at least one hatch 34, which is movable between a closed position and an open position (shown in FIG. 3) and dimensioned to allow the auxiliary power unit 24 to pass during maintenance operations.

To give an order of magnitude, the auxiliary power unit 24, its equipment and the primary structure 26 of the tail cone 16 have a weight of about 400 kg for a single-aisle aircraft.

As illustrated in FIG. 4, certain airports 36 provide ground power units 38 (also known by the acronym GPUs) configured to supply power to the aircraft on the ground, and, in particular, to the electrical and air-conditioning systems 22.1, 22.2 of the aircraft 10 and to the main propulsion units 20 during start-up thereof. At such airports 36, the auxiliary power unit 24 of the aircraft 10 is not used.

Given that not all airports are equipped with ground power units 38 and that aircraft may be required to operate under ETOPS conditions during their operation, aircraft are sold equipped with an auxiliary power unit 24, this increasing the weight of the aircraft 10 and therefore its energy consumption even though this auxiliary power unit 24 is not always required.

The present invention aims to remedy all or some of the drawbacks of the prior art.

SUMMARY OF THE INVENTION

To this end, one subject of the invention is a method for managing at least one aircraft, the aircraft being configured to perform a first category of flights not requiring any auxiliary power unit and a second category of flights requiring at least one auxiliary power unit, the aircraft comprising a fuselage that has a main portion.

According to the invention, the managing method comprises a step of removably mounting, aft of the main portion of the fuselage, alternately a lightened first tail cone not comprising any auxiliary power unit or a second tail cone comprising at least one auxiliary power unit depending on the first or second category of flights to be performed by the aircraft.

This managing method makes it possible to place an auxiliary power unit on board the aircraft only if the category of the flight to be performed by the aircraft requires it. Thus, when the category of the flight to be performed by the aircraft does not require it, the aircraft comprises a lightened tail cone without any auxiliary power unit, this leading to a decrease in the on-board weight and therefore in the energy consumption of the aircraft.

According to another feature, the managing method comprises, for at least one given flight to be performed, a step of determining, from among the first and second flight categories, to which category the given flight to be performed belongs, a step of determining, from among the first and second configurations, which configuration is suitable for the flight category determined in the previous step and a step of changing the configuration of the aircraft if the configuration of the aircraft does not correspond to the configuration determined in the previous step.

According to another feature, the managing method comprises a step of planning the flights to be performed by the aircraft, a step of determining the flight category to which each flight belongs and the configuration of the aircraft for each flight, a step of determining each scheduled stopover between two successive flights having different aircraft configurations and a step of planning a step of changing aircraft configuration for each stopover determined in the previous step.

Another subject of the invention is an aircraft making it possible to implement the managing method according to the preceding feature. According to the invention, the aircraft alternately comprises first and second tail cones positioned aft of the main portion of the fuselage and a removable aft link connecting the first or second tail cone and the main portion of the fuselage, the first tail cone being lightened and not comprising any auxiliary power unit, the second tail cone comprising an auxiliary power unit.

Another subject of the invention is a method for managing at least one fleet of aircraft. According to the invention, the managing method comprises a step of determining the flights to be performed by each of the aircraft of the fleet of aircraft, a step of determining the flight category to which each flight belongs and the configuration of the aircraft for each flight determined in the previous step, a step of determining, for each aircraft in the fleet of aircraft, stopovers where the aircraft is to undergo a step of changing configuration aiming to change its first or second tail cone and a step of planning the steps of changing the configuration of the aircraft of the fleet of aircraft for each stopover determined in the previous step.

According to another feature, at least a first tail cone is compatible with a plurality of aircraft and/or at least a second tail cone is compatible with a plurality of aircraft.

According to another feature, the planning step comprises predicting, for each step of changing configuration, the place and date of the step of changing configuration, the first or second tail cone to be installed compatible with the aircraft to be converted and the material and human resources required to carry out the step of changing configuration.

Another subject of the invention is a device for managing at least one fleet of aircraft making it possible to implement the method for managing at least one fleet of aircraft. According to the invention, the managing device comprises at least a first database containing the flights to be performed by the aircraft of the fleet of aircraft, at least a second database containing the departure and arrival airports of the flights of the aircraft of the fleet of aircraft and at least one manager configured to determine, based on the first and second databases, at least one schedule for the steps of changing configuration of the aircraft of the fleet of aircraft.

According to another feature, the first database contains, for each flight, at least the following characteristics: a departure airport, a departure date, an arrival airport, an arrival date and the operating conditions of the flight.

According to another feature, the second database contains, for each airport, whether the aircraft must be equipped with an auxiliary power unit or not.

According to another feature, the managing device comprises at least one operator configured to carry out the steps of changing configuration on the basis of the schedule established by the manager.

BRIEF DESCRIPTION OF THE DRAWINGS

Further features and advantages will become apparent from the following description of the invention, which description is given solely by way of example, with reference to the appended drawings in which.

DETAILED DESCRIPTION OF THE PREFERRED EMBODIMENTS

Figure 1:
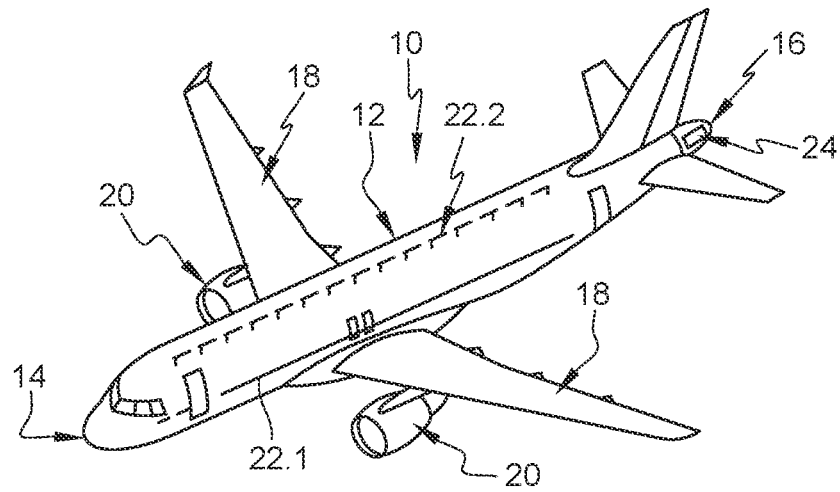
FIG. 1 is a perspective view of an aircraft equipped with an auxiliary power unit, illustrating one embodiment.
Figure 2:
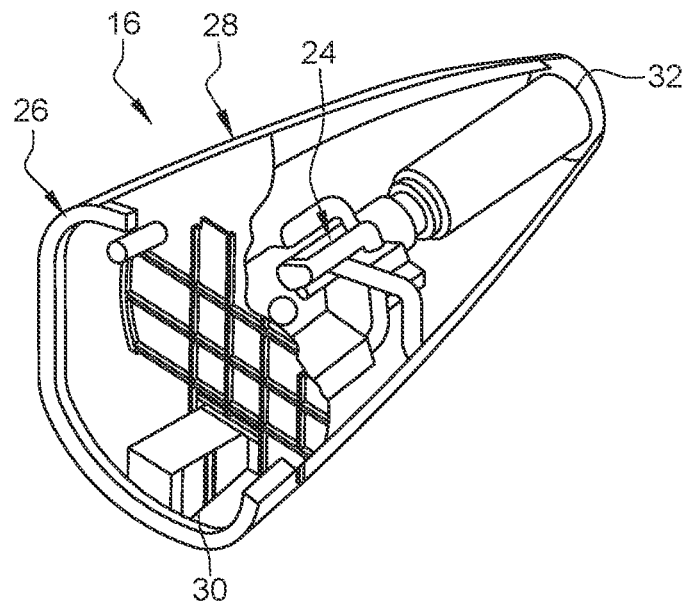
FIG. 2 is a perspective view of the inside of one portion of a tail cone of an aircraft comprising an auxiliary power unit, illustrating one embodiment.
Figure 3:
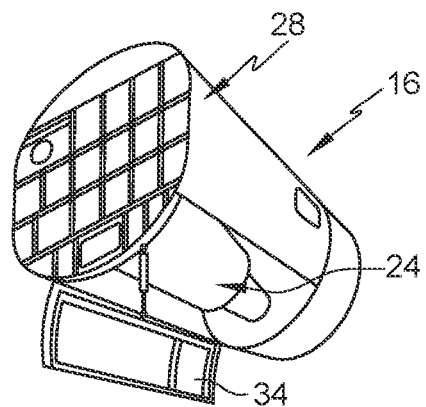
FIG. 3 is a perspective view of a tail cone of an aircraft comprising an open hatch, illustrating one embodiment.
Figure 4:
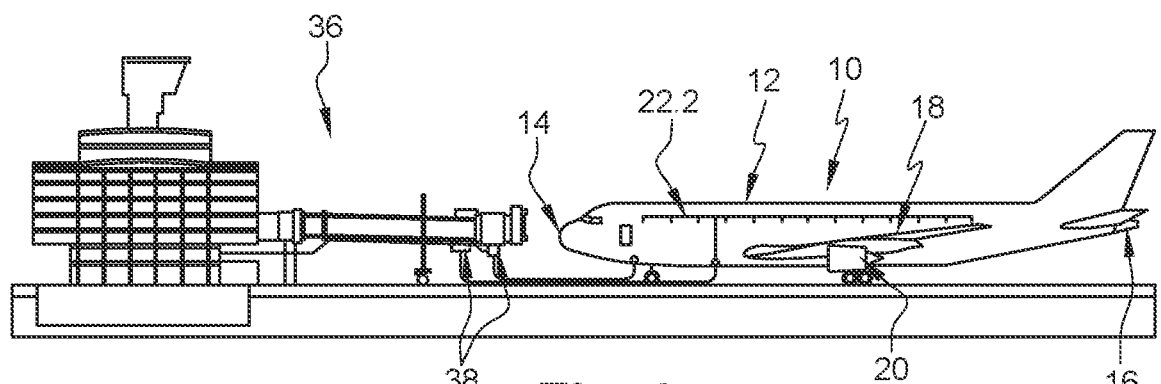
FIG. 4 is a side view of an aircraft and of an airport equipped with ground power units, illustrating one embodiment.

As illustrated in FIGS. 5 to 8, an aircraft 40 comprises a fuselage 42 that has a main portion 44, a front tip 45 positioned at the front of the main portion 44 and connected to the latter by a permanent front link, and a tail cone 46 positioned aft of the main portion 44 and connected to the latter by an aft link 46.1. The aircraft also comprises main propulsion units 48, at least one electrical system and at least one air-conditioning system. The main propulsion units 48 are configured to generate the power required by the electrical and air-conditioning systems to work. All these elements are not more described in more detail because they can be identical to those of the prior art.

Figure 5:
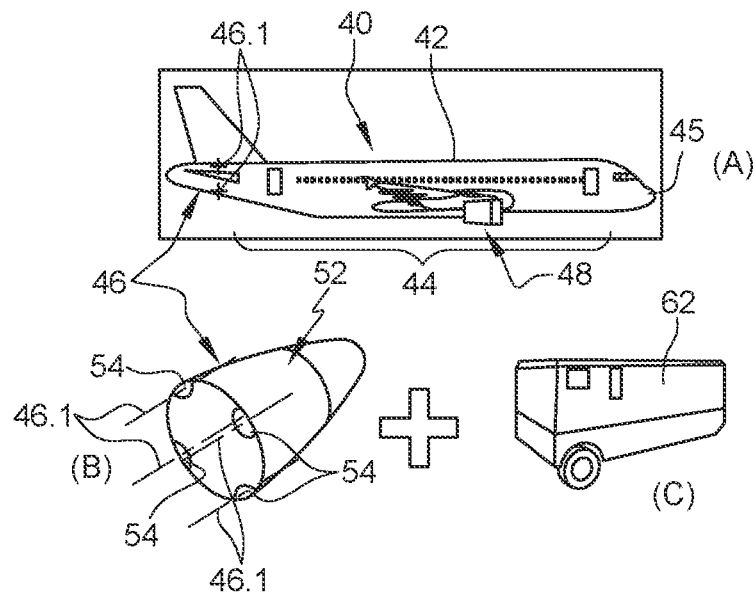
FIG. 5 is a side view of an aircraft (A) equipped with a lightened first tail cone (B) and configured to be powered by a ground power unit (C), illustrating one embodiment of the invention.
Figure 6:
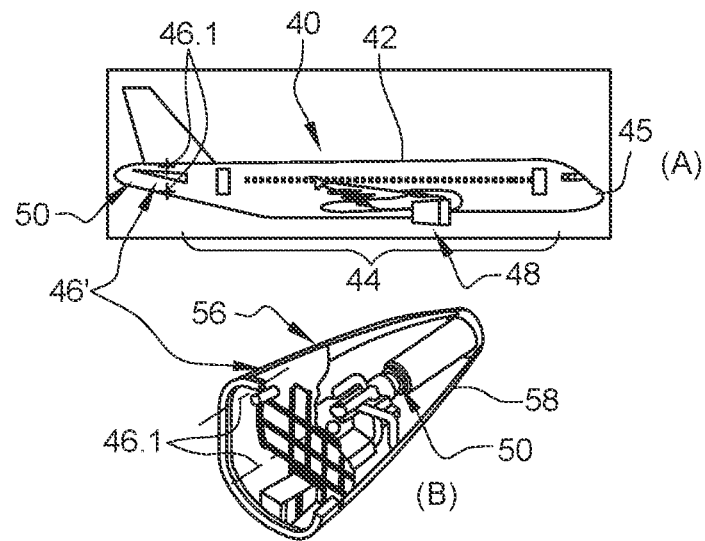
FIG. 6 is a side view of an aircraft (A) equipped with a second tail cone incorporating an auxiliary power unit (B), illustrating one embodiment of the invention.

The aircraft 40 is configured to alternately occupy a first configuration, shown in FIG. 5, in which the aircraft does not comprise any auxiliary power unit, and a second configuration, shown in FIG. 6, in which the aircraft comprises at least one auxiliary power unit 50. In the first configuration, the aircraft 40 can perform only missions of a first type, such as missions performed under what are said to be non-ETOPS conditions. In the second configuration, the aircraft 40 can perform missions of a second type, such as missions performed under what are said to be ETOPS conditions.

In the first configuration, the aircraft 40 comprises a first tail cone 46 connected by a removable aft link 46.1 to the main portion 44 of the fuselage 42. This first tail cone 46 is lightened and hollow. It comprises a fairing 52 and at least one plate 54 configured to be connected to the main portion 44 of the fuselage by the removable aft link 46.1.

This first tail cone 46 does not comprise any auxiliary power unit. It comprises neither equipment intended for an auxiliary power unit nor a main structure configured to bear the weight of an auxiliary power unit.

In the second configuration, the aircraft comprises a second tail cone 46' connected by the removable aft link 46.1 to the main portion 44 of the fuselage 42. According to one embodiment, the second tail cone 46' comprises a primary structure 56 comprising a plurality of transverse reinforcements, taking the form of a frame, that lie parallel to one another and that are positioned in transverse planes, and longitudinal reinforcements connecting the transverse reinforcements to one another. This primary structure 56 is dimensioned to bear the auxiliary power unit 50. The second tail cone 46' also comprises a secondary structure 58, taking the form of a fairing, attached to the primary structure 56 and equipment ensuring correct operation of the auxiliary power unit 50.

The auxiliary power unit 50 integrated into the second tail cone 46' is connected to each of the electrical and air-conditioning systems of the aircraft by a removable connecting system.

The second tail cone 46' is not described in more detail because it can be identical to those of the prior art mounted on aircraft operated under what are called ETOPS conditions.

According to one embodiment, the first tail cone 46 has a weight markedly less than that of the second tail cone 46', representing about ⅓ of the weight of the second tail cone 46'. In addition, the lightened first tail cone 46 requires virtually no maintenance.

According to one embodiment, the aft link 46.1 comprises a plurality of linking elements distributed around the circumference of the fuselage, for example taking the form of bolts. Thus, the first and second tail cones 46, 46' can be rapidly separated from the main portion 44 of the fuselage and swapped.

In order to facilitate handling of the first and second tail cones 46, 46', each of them comprises at least one hook and/or at least one lifting point allowing it to be handled during its installation or removal. Generally, each of the first and second tail cones 46, 46' comprises a plurality of hooks and/or lifting points to allow it to be lifted with a sling-based lifting system.

During operation thereof, each flight performed by the aircraft 40 is characterized by a departure airport 60.1, an arrival airport 60.2 (shown in FIG. 7) and ETOPS or non-ETOPS operating conditions.

Depending on its equipment level, a departure or arrival airport 60.1, 60.2 may comprise at least one ground power unit 62, as shown in FIG. 5. Thus, at certain departure or arrival airports 60.1, 60.2, the presence of auxiliary power units 50 is not required.

Therefore, the aircraft 40 is configured to perform a first category of flights not requiring any auxiliary power unit 50 and a second category of flights requiring an auxiliary power unit 50.

Flights in the first category are those effected under non-ETOPS operating conditions and for which the departure and arrival airports 60.1, 60.2 allow the aircraft to be supplied with power on the ground.

Flights in the second category are those effected under ETOPS operating conditions, or conditions for which at least one airport among the departure and arrival airports 60.1, 60.2 does not allow the aircraft 40 to be supplied with power on the ground.

According to the invention, a method for managing an aircraft configured to perform a first category of flights not requiring any auxiliary power unit 50 and a second category of flights requiring at least one auxiliary power unit 50 comprises a step of removably mounting, aft of the main portion 44 of the fuselage 42, alternately a lightened first tail cone 46 not comprising any auxiliary power unit or a second tail cone 46' comprising at least one auxiliary power unit 50 depending on the first or second category of flights to be performed by the aircraft.

For an aircraft 40 configured to alternately occupy a first configuration in which the aircraft does not comprise any auxiliary power unit 50 and has a lightened first tail cone 46 and a second configuration in which the aircraft comprises an auxiliary power unit 50 positioned in a second tail cone 46', a method for managing the aircraft 40 comprises, for at least one given flight to be performed, a step of determining, from among the first and second flight categories, to which category the given flight belongs, a step of determining, from among the first and second configurations, which configuration is suitable for the flight category determined in the previous step and a step of changing configuration if the configuration of the aircraft does not correspond to the configuration determined in the previous step.

Figure 7:
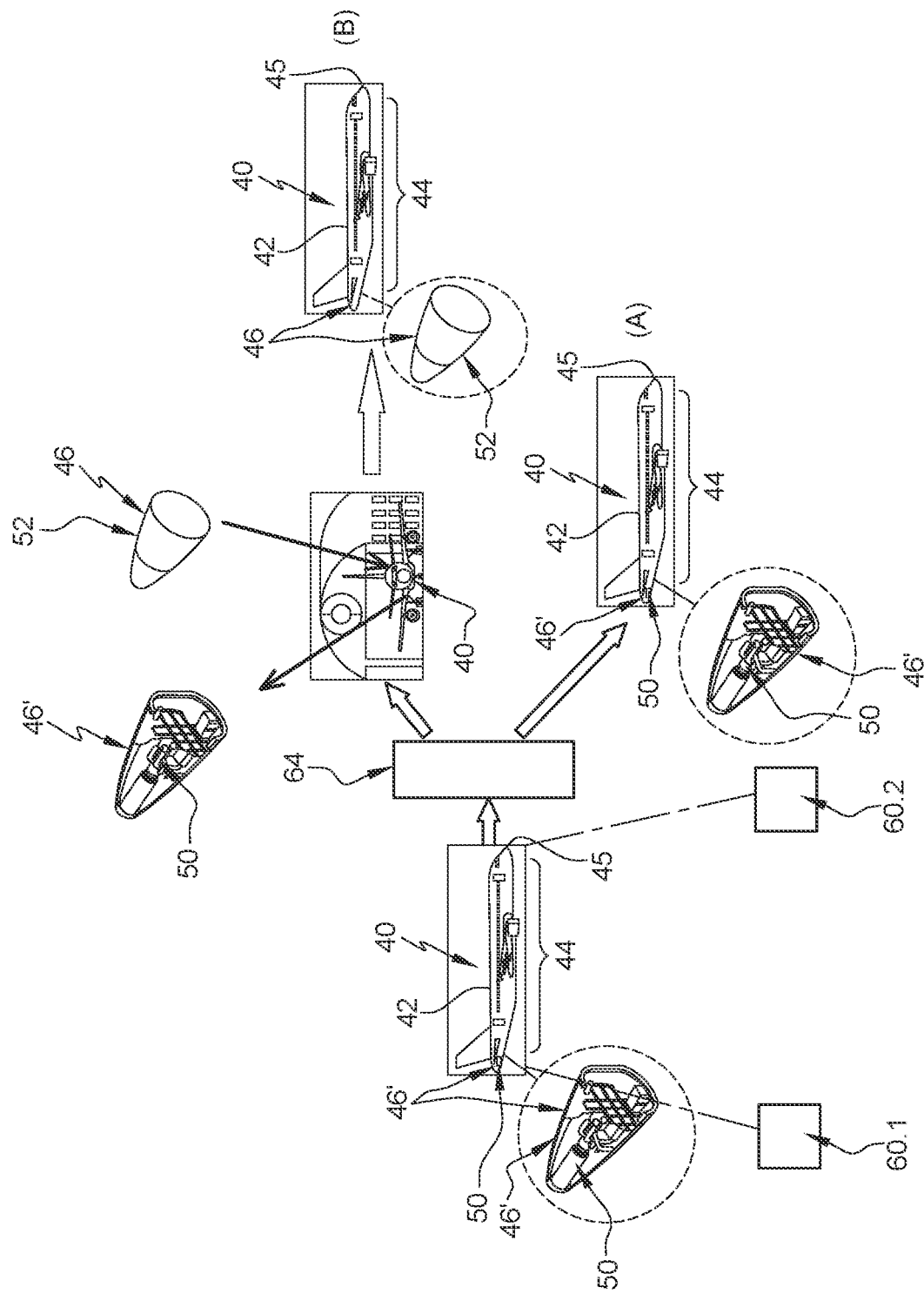
FIG. 7 is a schematic representation of a method for managing an aircraft, illustrating one embodiment of the invention.

In one example, illustrated in FIG. 7, the aircraft 40 is configured to have the second configuration and comprises a second tail cone 46' comprising an auxiliary power unit 50. Prior to a new flight, the method for managing the aircraft 40 comprises a step of determining the flight category 64 to which the new flight belongs. If the latter belongs to the second category, the aircraft remains in the same configuration, as illustrated in section (A) of FIG. 7. If the new flight belongs to the first flight category, then the aircraft 40 undergoes a step of changing configuration, the second tail cone 46' incorporating the auxiliary power unit 50 being removed and replaced by a lightened first tail cone 46, as illustrated in section (B) of FIG. 7.

According to the managing method, if two successive flights belong to the same flight category then the aircraft remains unchanged. If two successive flights belong to different flight categories, then the aircraft 40 is subjected to a step of changing configuration, between the two successive flights, in which step the first and second tail cones 46, 46' are swapped.

The managing method makes it possible to optimize the weight of the aircraft according to the category of the flight to be performed. Thus, if the auxiliary power unit 50 is not required, the aircraft 40 comprises a lightened first tail cone 46, this resulting in a substantial decrease in the weight of the aircraft. If the conditions mean that use of an auxiliary power unit 50 is required, then the aircraft 40 comprises a second tail cone 46' incorporating an auxiliary power unit 50. Thus, contrary to the prior art, the aircraft 40 is not configured in the same way throughout its operating life. Its configuration is adapted to the conditions of use.

In one operating mode, the method for managing the aircraft 40 comprises a step of planning the flights to be performed by the aircraft 40, a step of determining the flight category to which each flight belongs and the configuration of the aircraft 40 for each flight, a step of determining each scheduled stopover between two successive flights having different aircraft configurations and a step of planning a step of changing configuration for each stopover determined in the previous step.

Thus, it is possible to anticipate the steps of changing aircraft configuration and to predict, for each stopover requiring a change of configuration, the material and human resources required for this change of configuration.

This managing method may be applied to a plurality of aircraft, such as a fleet of aircraft belonging to one or more airlines and/or to one or more operators using aircraft.

According to another particularity, at least a first tail cone 46 is compatible with a plurality of aircraft and can be successively attached to various aircraft, such as aircraft of the same family of aircraft, for example. In parallel, at least a second tail cone 46' is compatible with a plurality of aircraft and can be successively attached to various aircraft, such as aircraft of the same family of aircraft for example. Thus, at a departure or arrival airport 60.1, 60.2, a first tail cone 46 of a first aircraft can be removed and mounted on a second aircraft.

According to another feature, the first and second tail cones 46, 46' are divided into a plurality of families of tail cones, the first or second tail cones 46, 46' of a given family of tail cones being interchangeable and able to be mounted on various aircraft of the same family of aircraft.

Figure 8:
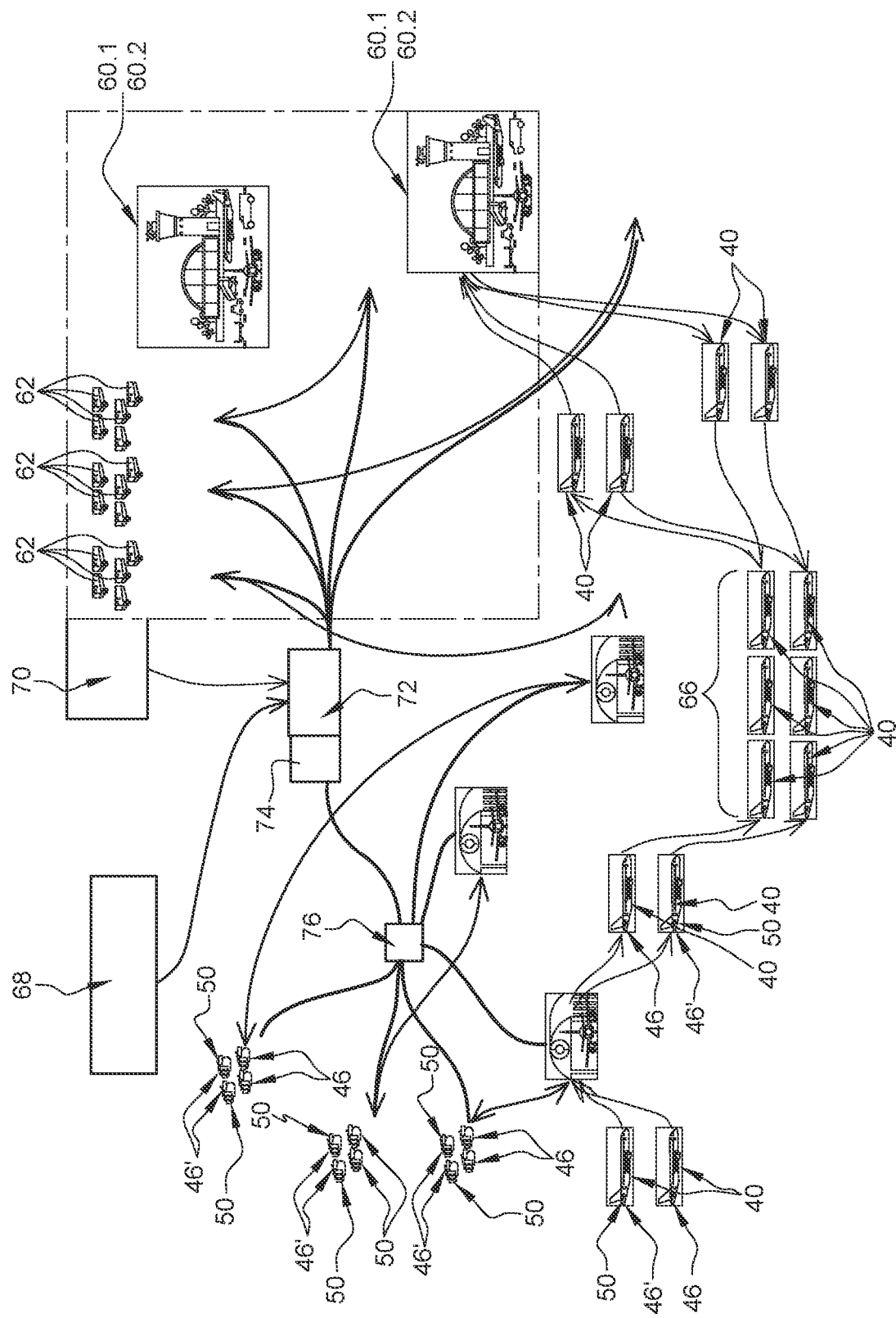
FIG. 8 is a schematic representation of a method for managing a fleet of aircraft illustrating one embodiment of the invention.

In one operating mode illustrated in FIG. 8, a method for managing at least one fleet of aircraft 66 comprises a step of determining the flights to be performed by each of the aircraft 40 of the fleet of aircraft 66, a step of determining the flight category to which each flight belongs and the configuration of the aircraft 40 for each flight determined in the previous step, a step for determining, for each aircraft 40 in the fleet of aircraft 66, stopovers where the aircraft 40 is to undergo a step of changing configuration aiming to change the tail cone 46, 46' and a step of planning steps of changing the configuration of the aircraft of the fleet of aircraft 66 for each stopover determined in the previous step.

This planning step comprises predicting, for each step of changing configuration, the place and date of the step of changing configuration, the first or second tail cone 46, 46' to be installed compatible with the aircraft to be converted and the material and human resources required to carry out the step of changing configuration.

As illustrated in FIG. 8, a device making it possible to implement the method for managing at least one fleet of aircraft 66 comprises at least a first database 68 containing all the flights to be performed by the aircraft 40 of the fleet of aircraft 66, at least a second database 70 containing the departure and arrival airports of the flights of the aircraft 40 of the fleet of aircraft 66 and at least one manager 72 configured to determine, based on the first and second databases 68, 70, at least one schedule 74 for the steps of changing configuration of the aircraft 40 of the fleet of aircraft.

The first database 68 relating to the flights contains, for each flight, at least the following characteristics: a departure airport, a departure date, an arrival airport, an arrival date and the ETOPS or non-ETOPS operating conditions of the flight.

The second database 70 relating to the airports contains, for each airport 60.1, 60.2, whether the aircraft 40 must be equipped with an auxiliary power unit 50 or not.

The first and second databases 68 and 70 could be grouped together in one and the same database.

Based on the second database 70, the manager 72 determines, for each flight contained in the first database 68, whether it belongs to the first or second category and then the configuration of the aircraft 40 performing the flight.

Knowing the configuration of the aircraft 40 of each flight, the manager 72 is able to determine the schedule 74 of the steps of changing configuration of the aircraft 40 of the fleet of aircraft 66. For each planned step of changing configuration, the manager 72 determines the date and place of the step of changing configuration, the human and material resources required to carry out the step of changing configuration and the first or second tail cone 46, 46' to be installed in the step of changing configuration in replacement of the tail cone on the aircraft.

The device for managing at least one fleet of aircraft 66 comprises at least one operator 76 configured to carry out the steps of changing configuration on the basis of the schedule 74 established by the manager 72. Knowing, for each step of changing configuration, the date and place of the step of changing configuration, the human and material resources required to carry out the step of changing configuration and the first or second tail cone 46, 46' to be installed in the step of changing configuration, the operator 76 can modify the aircraft safely and rapidly, while limiting the risk of impact on the schedule of the flights.

This method for managing a fleet of aircraft makes it possible to place a second tail cone 46' incorporating an auxiliary power unit 50 at the rear of an aircraft only if the category of the flight to be performed by the aircraft requires it. Thus, when the category of the flight to be performed by the aircraft does not require it, the aircraft may comprise a lightened first tail cone 46 without any auxiliary power unit 50, this leading to a decrease in the on-board weight and therefore in the energy consumption of the aircraft or to an increase in the payload weight transported.

The systems and devices described herein may include a controller, such as manager 72 and operator 76, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing at least one aircraft, said aircraft, in a first configuration, being configured to perform a first category of flights not requiring any auxiliary power unit and, in a second configuration, to perform a second category of flights requiring at least one auxiliary power unit, the aircraft comprising a fuselage that has a main portion; wherein the managing method comprises:
removably mounting, aft of the main portion of the fuselage, alternately a lightened first tail cone not comprising any auxiliary power unit or a second tail cone comprising the at least one auxiliary power unit, depending on the first or second category of flights to be performed by the aircraft.

2. The method for managing at least one aircraft according to claim 1, wherein the managing method comprises, for at least one given flight to be performed:
a step of determining, from among the first and second flight categories, to which category the given flight to be performed belongs,
a step of determining, from among the first and second configurations, which configuration is suitable for the flight category determined in the previous step, and
a step of changing the configuration of the aircraft if the configuration of the aircraft does not correspond to the configuration determined in the previous step.

3. The method for managing at least one aircraft according to claim 2, wherein the managing method comprises:
a step of planning the flights to be performed by the aircraft,
a step of determining the flight category to which each flight belongs and the configuration of the aircraft for each flight,
a step of determining each scheduled stopover between two successive flights having different aircraft configurations, and
a step of planning a step of changing the configuration of the aircraft for each stopover determined in the previous step.

4. An aircraft configured to implement the managing method according to claim 1, the aircraft comprising:
a fuselage that has a main portion,
wherein the aircraft alternately comprises first and second tail cones positioned aft of the main portion of the fuselage and a removable aft link connecting the first or second tail cone and the main portion of the fuselage, the first tail cone being lightened and not comprising any auxiliary power unit,
the second tail cone comprising an auxiliary power unit.

5. A method for managing at least one fleet of aircraft according to claim 1, wherein the managing method comprises:
a step of determining the flights to be performed by each of the aircraft of the fleet of aircraft,
a step of determining the flight category to which each flight belongs and the configuration of the aircraft for each flight determined in the previous step,
a step of determining, for each aircraft in the fleet of aircraft, stopovers where the aircraft is to undergo a step of changing configuration aiming to change the first tail cone or the second tail cone of the aircraft, wherein at least one of the first and second tail cone is compatible with a plurality of aircraft, and
a step of planning the steps of changing the configuration of the aircraft of the fleet of aircraft for each stopover determined in the previous step.

6. The method for managing at least one fleet according to claim 5, wherein the planning step comprises predicting, for each step of changing configuration:
a place and date of the step of changing configuration,
the first or second tail cone to be installed compatible with the aircraft to be converted, and
a quantity of time required to carry out the step of changing configuration.

7. A device for managing at least one fleet of aircraft configured to implement the method for managing at least one fleet of aircraft according to claim 5, wherein the managing device comprises:
at least a first database containing the flights to be performed by the aircraft of the fleet of aircraft,
at least a second database containing departure and arrival airports of the flights of the aircraft of the fleet of aircraft, and
at least one manager configured to determine, based on the first and second databases, at least one schedule for the steps of changing configuration of the aircraft of the fleet of aircraft.

8. The device for managing at least one fleet of aircraft according to claim 7, wherein the first database contains, for each flight, at least the following characteristics:
a departure airport,
a departure date,
an arrival airport,
an arrival date, and
operating conditions of the flight.

9. The device for managing at least one fleet of aircraft according to claim 7, wherein the second database contains, for each airport, whether the aircraft must be equipped with an auxiliary power unit, or not.

10. The device for managing at least one fleet of aircraft according to claim 7, wherein the managing device comprises at least one controller configured to carry out the steps of changing configuration based on the schedule established by the manager.

* * * * *